(12) United States Patent
Rosenberg et al.

(10) Patent No.: US 11,240,473 B2
(45) Date of Patent: Feb. 1, 2022

(54) METHOD AND APPARATUS FOR TRAFFIC INFRACTION MANAGEMENT

(71) Applicant: CarmaCam, Inc., Santa Monica, CA (US)

(72) Inventors: Doug Rosenberg, Santa Monica, CA (US); Zilu Li, Los Angeles, CA (US)

(73) Assignee: CarmaCam, Inc., Santa Monica, CA (US)

( * ) Notice: Subject to any disclaimer, the term of this patent is extended or adjusted under 35 U.S.C. 154(b) by 0 days.

(21) Appl. No.: 17/006,859

(22) Filed: Aug. 30, 2020

(65) Prior Publication Data

US 2021/0067745 A1 Mar. 4, 2021

Related U.S. Application Data

(60) Provisional application No. 62/893,737, filed on Aug. 29, 2019.

(51) Int. Cl.
*H04N 5/77* (2006.01)
*H04N 7/18* (2006.01)
*G06K 9/00* (2006.01)
*G08G 1/054* (2006.01)

(52) U.S. Cl.
CPC ......... *H04N 7/183* (2013.01); *G06K 9/00718* (2013.01); *G06K 9/00791* (2013.01); *G08G 1/054* (2013.01); *H04N 5/77* (2013.01); *G06K 2009/00738* (2013.01); *G06K 2209/15* (2013.01)

(58) Field of Classification Search
None
See application file for complete search history.

(56) References Cited

U.S. PATENT DOCUMENTS

| | | | | |
|---|---|---|---|---|
| 9,916,755 | B1* | 3/2018 | Ratti | G08G 1/0133 |
| 2008/0252485 | A1* | 10/2008 | Lagassey | G07C 5/008 |
| | | | | 340/907 |
| 2013/0009789 | A1* | 1/2013 | Ichikawa | G08G 1/167 |
| | | | | 340/904 |

* cited by examiner

*Primary Examiner* — Eileen M Adams
(74) *Attorney, Agent, or Firm* — Foundation Law Group LLP; JD Harriman

(57) ABSTRACT

The system provides a way to detect potential impaired driving and to easily and automatically report it to enforcement officials. The system can create a video record of the impaired driving and send the video to an enforcement official who can be notified to intercept the impaired driver. In one embodiment, the system can be implemented on a stand-alone system or a smartphone. The system uses video recording technology and a tracking system to identify vehicles making excessive numbers of lane changes, failure to maintain a lane, unusual vehicle speed behaviors, and the like. Based on vehicle behavior, the system can determine if a particular vehicle is exhibiting behavior that indicates impaired driving. The system can record video of the vehicle behavior and send it to the nearest enforcement officer.

10 Claims, 17 Drawing Sheets

1600

METHOD AND APPARATUS FOR TRAFFIC INFRACTION MANAGEMENT

This patent application claims priority to U.S. Provisional Patent Application 62/893,737 filed on Aug. 29, 2020, which is incorporated by reference herein in its entirety.

BACKGROUND OF THE SYSTEM

Driving can be a dangerous activity when other drivers are not following the law and the rules of the road. Police and traffic enforcement officials are limited in number and cannot catch or enforce every infraction. When an officer is issuing a citation, that officer is unable to provide enforcement against other drivers during that time.

Automated systems have been implemented to improve traffic safety and to automatically enforce certain traffic laws. For example, red light cameras can detect and automatically ticket vehicles that enter an intersection after a traffic control light has turned red. Speed cameras can detect vehicles travelling above a posted speed limit and automatically issue citations for speeding. A disadvantage of such systems is that the drivers being ticketed do not learn for days or weeks later of the infraction. This means that dangerous behavior can continue for an unacceptable amount of time. Another disadvantage of fixed location traffic cameras is that they only cover a tiny fraction of the road network. Drivers quickly learn the locations of fixed traffic cameras and can modify their behavior when they are at camera locations.

Many GPS systems now warn drivers of the location of speed cameras, red light cameras, and other automated enforcement efforts. When a driver does not know where enforcement efforts are located, the drive must maintain care at all times or risk a ticket. When the driver knows where the enforcement efforts are located, the driver can drive with care at those locations, but with greater disregard at other areas, creating risk and danger.

Another problem with current automated systems is that they are limited to just certain traffic violations, such as running red lights, speeding, and the like. There are many dangerous behaviors that are not currently subject to automated enforcement.

One of the most dangerous driving behaviors is driving under the influence (e.g. drunk driving). The number of impaired drivers at any one time on the road far exceeds the number of officers available to detect and stop such drivers. It has been estimated that impaired drivers make hundreds of vehicle trips while impaired for each time they are pulled over. Even if another driver detects an impaired driver and reports it to enforcement, it is often impossible for an officer to track and engage the impaired driver. Calling 911 is the default method for reporting DUI infractions but it suffers from problems including reluctance of drivers to call and delays in getting information through human dispatch to first responders in the field.

SUMMARY

The system provides a way to detect driving infractions, potential impaired driving, unsafe driving, parking violations, and emergency situations ("traffic incidents") and to easily and automatically report it to enforcement officials. The system can create a video record of the impaired driving and send the video to an enforcement official who can be notified to intercept the impaired driver. The system provides crowd-sourced reporting of traffic incidents and notifies authorities who can act accordingly. In one embodiment, the system can be implemented on a stand-alone system or a smartphone. The system uses video recording technology and a tracking system to identify vehicles making excessive numbers of lane changes, failure to maintain a lane, unusual vehicle speed behaviors, speeding, illegal lane change, running red lights and stop signs, illegal U-turns, inappropriate use of certain lanes (e.g. HOV lanes, Bus lanes, bike lanes, etc.) illegal parking, traffic accidents, and the like. Based on vehicle behavior, the system can determine, for example, if a particular vehicle is exhibiting behavior that indicates a traffic incident. The system can record video of the vehicle behavior and automatically send it to a processing system for forwarding to the nearest enforcement officer. In one embodiment, detection and reporting of infractions is done manually by humans, with AI being applied to automatically screen videos prior to sending them to first responders. In one embodiment, the system interfaces with onboard systems such as collision avoidance systems to detect and report certain violations automatically.

In one embodiment, human reviewers are used to confirm the impaired driving before notifying an enforcement official. In one embodiment, machine learning and/or AI is utilized to analyze data and to determine whether the detected behavior should be sent to enforcement officials. The system can monitor the database and use geospatial queries to route possible infractions to nearby first responders.

DETAILED DESCRIPTION OF THE SYSTEM

The system provides a method and apparatus to detect one or more traffic incidents and report the violations to an enforcement authority. The system comprises an application that can be implemented on a smartphone and/or standalone processing device. In one embodiment, the system can utilize integrated vehicle cameras (e.g. front facing cameras) to support its operation. In one embodiment, the system utilizes the dashboard mounted smartphone camera to detect potential moving traffic violations.

Figure 1:
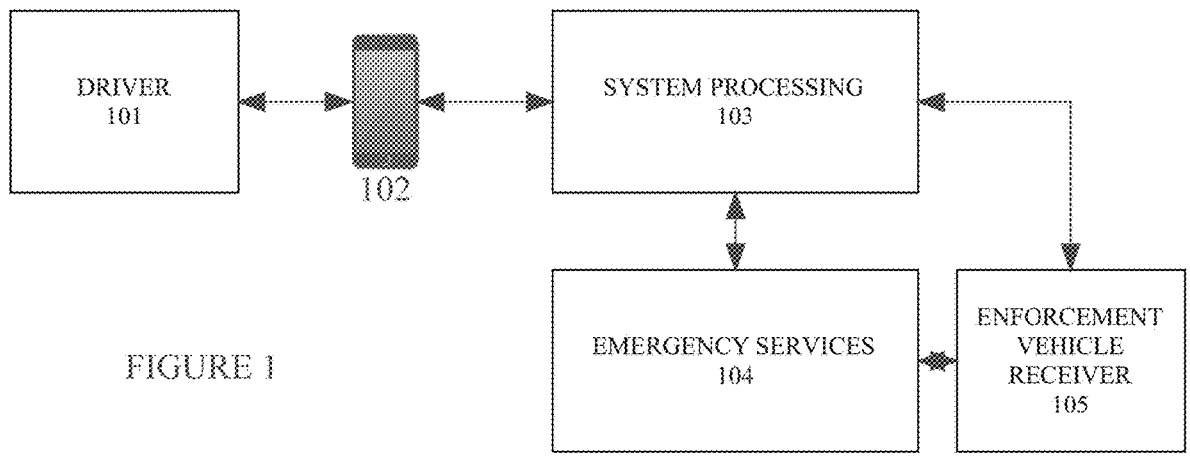
FIG. 1 is a block diagram of one embodiment of the system.

FIG. 1 is a block diagram of one embodiment of the system. A driver 101 uses an image capture device 102, such as a smartphone, dashcam, integrated vehicle camera, and the like, which records information about vehicles in its field of vision. The data may be forwarded to the System Processing 103 which may be implemented as a server or in the cloud. When appropriate, the System Processing 103 can forward information about a potential violation to Emergency Services 104 and/or one or more enforcement vehicle receivers 105.

For purposes of discussion, we will refer to the image capture device 102 as a smartphone. It should be noted that the system may be implemented with a variety of standalone and integrated image capture devices without departing from the scope and spirit of the system. The system includes an app that is loaded on the smartphone 102 to capture and analyze vehicle behaviour and information. In one embodiment the app can interface to vehicle onboard systems such as a collision avoidance system. In addition, the app can interface with cameras built into a vehicle. If multiple cameras are available, the system can analyze views from multiple camera angles to identify traffic incidents surrounding the vehicle.

Figure 2:
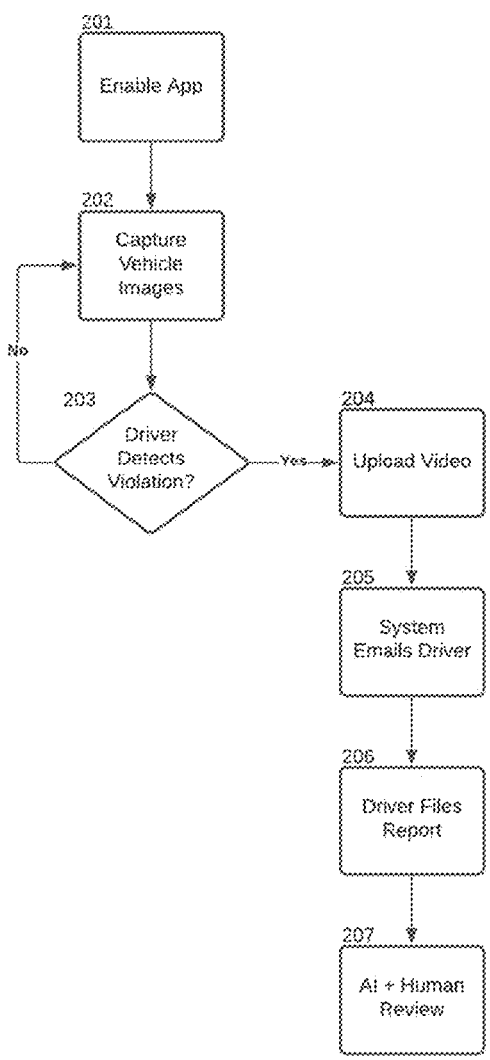
FIG. 2 is flow diagram illustrating operation of one embodiment of the system.

FIG. 2 is a flow diagram of the operation of the system in an embodiment. At step 201, the Driver 101 enables the app on the smartphone 102. If the image capture device of the smartphone is to be used, the smartphone should be mounted (e.g. on the dash) so that the road in front of the vehicle is visible to the image capture device. If the system is using the integrated vehicle cameras, the phone can be mounted in a different location.

In one embodiment, the smartphone is mounted in landscape orientation, so that a wide field of view is presented. At step 202, the smartphone 102 continuously captures image information about vehicles in its field of view. In one embodiment the system detects license plates of each vehicle. This step is implemented with a license plate reader such as Open ALPR for example.

At decision block 203 it is determined if the driver has detected a violation by a vehicle. If not, the system returns to step 202.

If so, the system proceeds to step 204. If the driver has detected a potential traffic incident, the driver need only tap anywhere on the device display to initiate video capture and reporting. When the driver taps, the system automatically captures the last 20 seconds of video and forwards it to the system for review at step 204. The reporting step 204 generates an incident report that includes the video, license plate numbers of vehicles, geo-location information, as well as time of day, direction of travel, route, and other metadata that is useful in analyzing the video. When filing the incident report the driver captures an image of the offending vehicle. Machine learning (using Open ALPR ("A License Plate Reader"), for example) reads the license plate number and asks the user to confirm it in an embodiment.

In one embodiment, the system sends an email with the report to the driver at step 205. The driver retrieves the uploaded video at a later time when they are not driving and can complete an incident report that includes the video, frame captures, and other information. Some of the metadata is included automatically by the system, such as location, route, direction, and the like. The driver files the incident report at step 206.

At step 207, the forwarded information is reviewed by the system. This may be accomplished by human review, machine learning systems, and/or a combination of the two. In one embodiment, artificial intelligence is used to review the behaviour of the noted vehicle. If the alert passes the review at step 207, the information is forwarded to law enforcement. In one embodiment, law enforcement is a participant in the system and enforcement vehicles that are located near the offending vehicle (and can best intercept it quickly) are alerted. In one embodiment, enforcement can also include insurance companies. The incident history about a particular driver could be an important metric for insurance coverage and rates.

Figure 17:
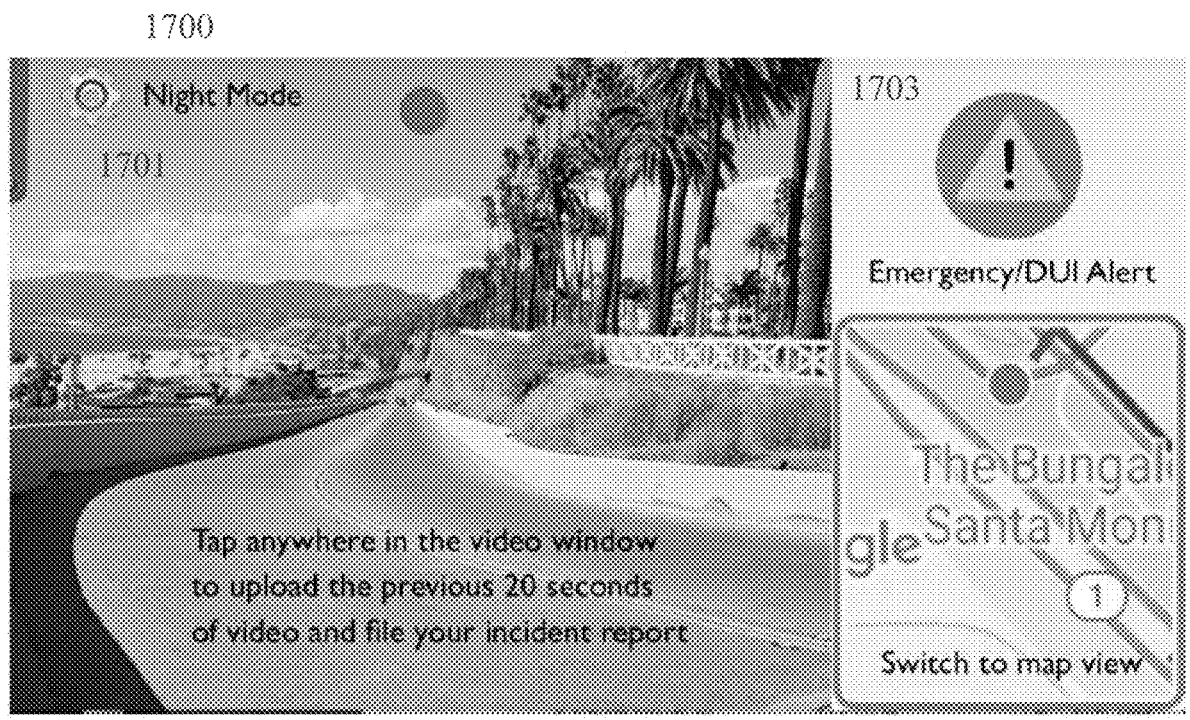
FIG. 17 illustrates the display of the driver device in an embodiment.

FIG. 17 illustrates an embodiment of a display of the system. The display 1700 includes a video portion 1701 that shows the view in front of the vehicle. As noted, the driver (or passenger) can tap anywhere in the display area 1700 to cause the system to capture the last 20 seconds of video to create an incident report. (Note, the system may capture more or less than 20 seconds of video without departing from the scope and spirit of the system). In one embodiment a map view region 1702 allows the driver to switch between video 1701 and map view 1702. A smaller version of the video remains visible on the display 1700 but the map 1702 is enlarged for navigation. Again, tapping anywhere on the display 1700 will initiate an incident report.

In one embodiment, the system includes an emergency alert icon 1703 that is always on the display. When the driver taps the emergency alert icon 1703, the system enters the emergency reporting mode as described in FIG. 14.

Figure 14:
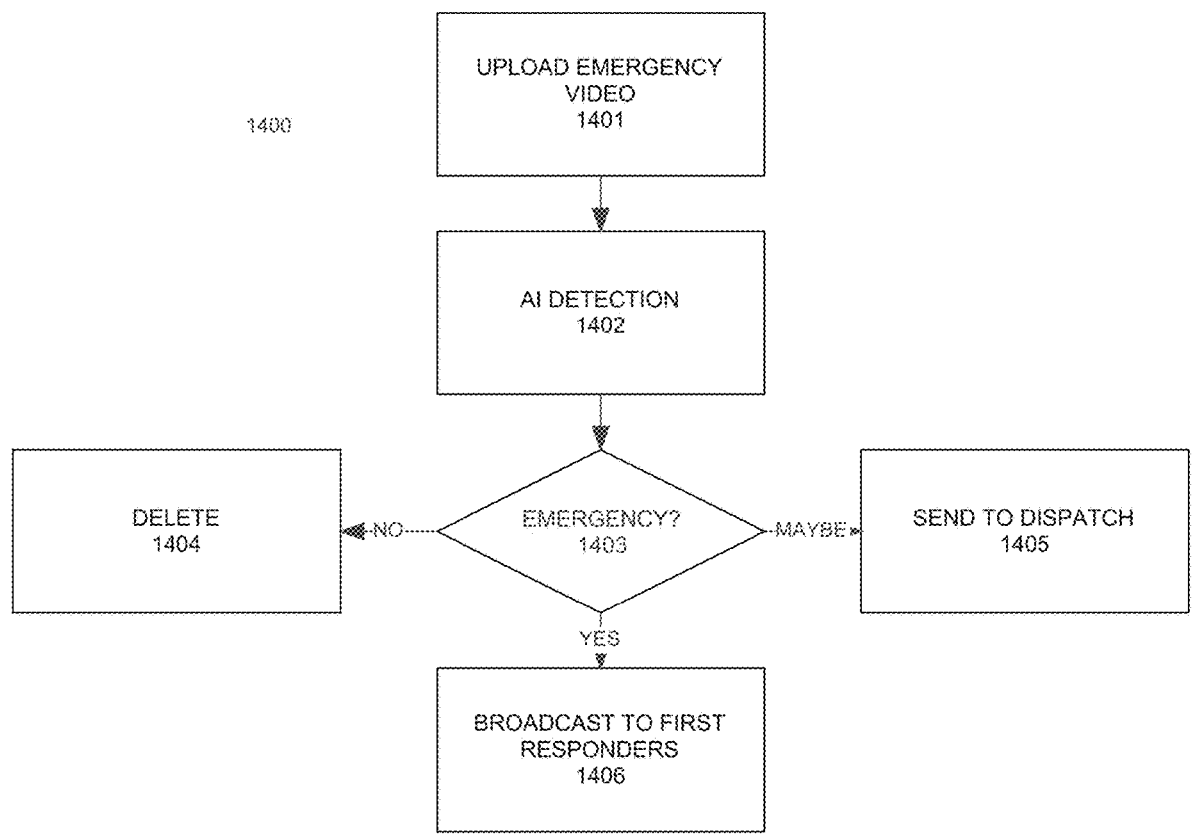
FIG. 14 is a flow diagram illustrating emergency reporting in an embodiment.

FIG. 14 is a flow diagram illustrating the emergency reporting mode 1400 in an embodiment. At step 1401 a user taps the emergency reporting icon causing the upload of 20 seconds of video. The video is sent to an emergency detection process 1402 (in one embodiment it is for DUI detection). In one embodiment this process is performed by an AI that scores the video to ensure that it represents a true emergency. At decision block 1403 it is determined if the score is above the threshold for an emergency. If it is not, the video is deleted at step 1404. If the score is above the threshold for a possible emergency, but below a certainty threshold (e.g. "maybe") the video is sent to dispatch of an enforcement agency for manual review. In one embodiment, enforcement agencies have a version of the app that allows them to receive incident reports and to determine if a response is appropriate.

If the video is above the certainty threshold at decision block 1403, the system broadcasts it to first responders in the area of the incident. In one embodiment, law enforcement vehicles include a receiver to automatically acquire emergency videos generated by the system that are within a range of the vehicle. In one embodiment, the receiver app allows the enforcement vehicle to see the real time status of other enforcement vehicles that may be responding to the same video.

Figure 3:
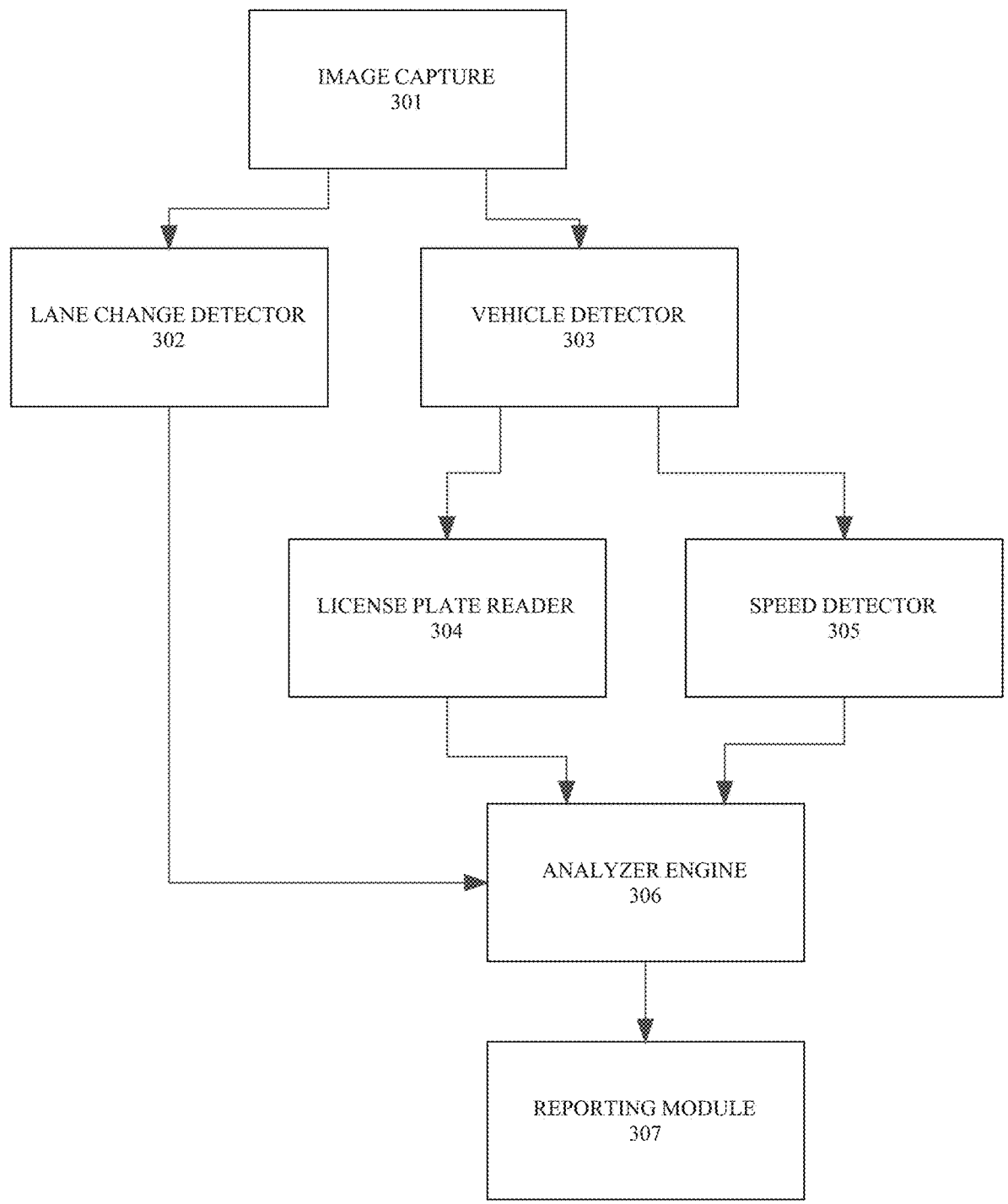
FIG. 3 is a block diagram of an application in an embodiment of the system.

FIG. 3 is a block diagram of the monitoring application in an embodiment of the system. The system includes image capture 301. This may utilize the built-in camera of a smartphone that is running an app implementing the system. A Lane Change Detector and Vehicle Detector 303 are used to identify possible impaired drivers (or other violations). License Plate Reader 304 is used to detect and identify a license plate of vehicles tracked by the system. Speed Detector 305 can determine the speed of surrounding vehicles. Data from the components is provided to the Analyzer Engine 306 that is used to identify possible violations which can then be forwarded via the Reporting Module 307.

In one embodiment, the Analyzer Engine 306 includes embedded AI and the analysis that is done at step 207 can be performed in-vehicle by the Engine 306. The embedded AI may use TensorFlow Lite to enable on-device machine learning. The phone can run TensorFlow and YOLO (object detector) in real time and automatically trigger video uploads without driver interaction. The processes for Lane Change Detector, Vehicle Detector, and License Plate Reader are all parts of the Analyzer Engine in an embodiment.

Figure 18:
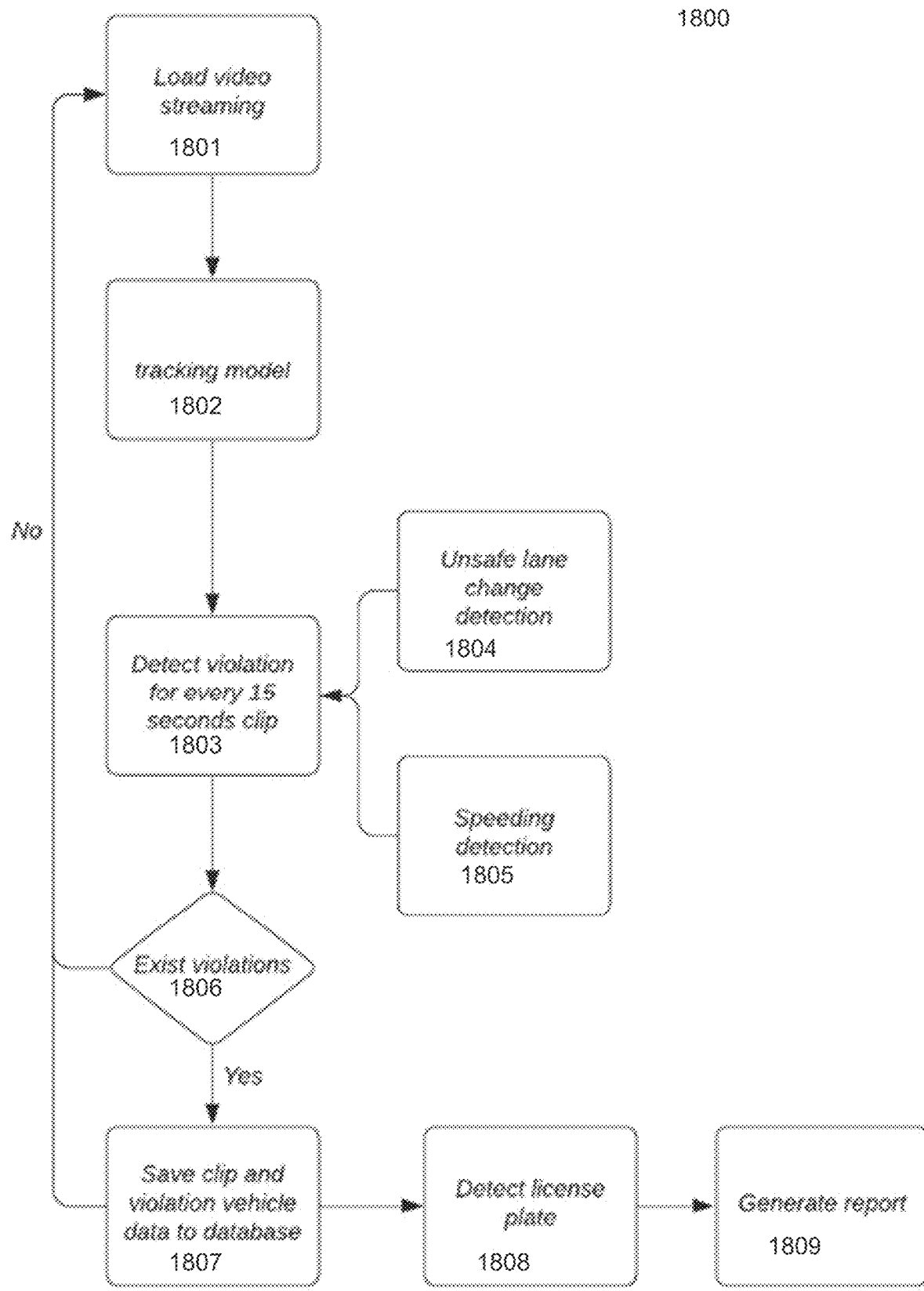
FIG. 18 is a flow diagram illustrating on-device AI processing in an embodiment of the system.

FIG. 18 is a flow diagram 1800 that illustrates the operation of an on-device artificial intelligence and an embodiment of the system. At step 1801 the on vehicle device will load streaming video. At step 1802 the system will use a tracking model to observe various vehicles in the field of vision of the device. At step 1803 the system will check every 15 seconds of video for possible violations. In this example the system may include unsafe Lane change detection processing 1804 speeding detection processing 1805 and others. A decision block 1806 it is determined if violations exist. If not, the system returns to step 1801 if so, the system proceeds to step 1807 and saves the clip and the vehicle data information to a database. In step 1808 the license plate is detected and a report is generated at step 1809.

Figure 4:
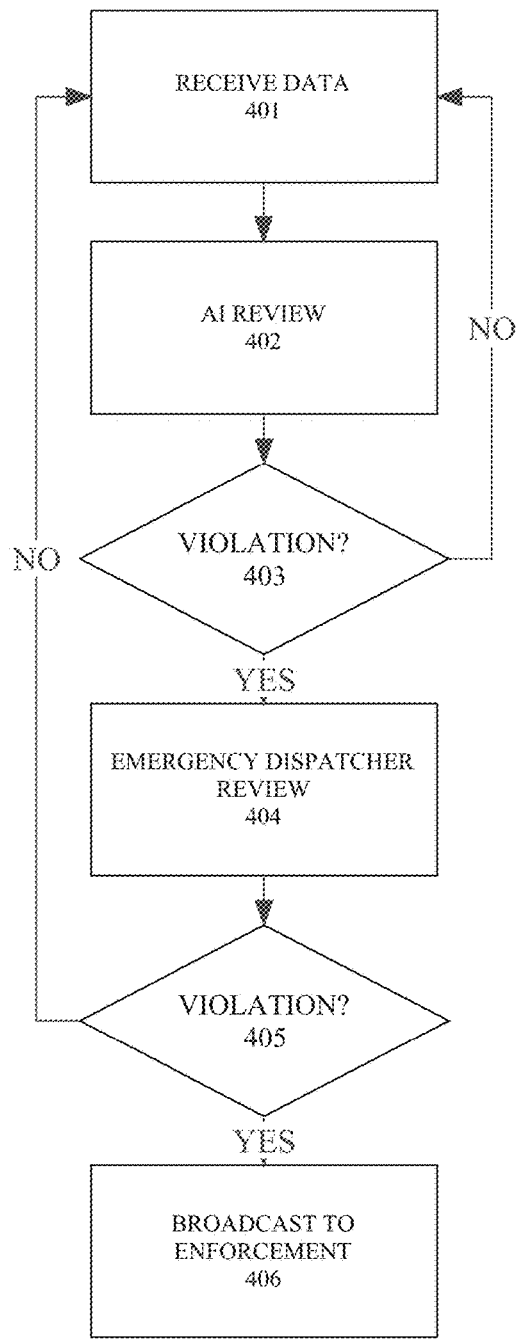
FIG. 4 is a flow diagram illustrating operation of the system in an embodiment.

FIG. 4 is a flow diagram of a combined AI/Human Review process in an embodiment of the system. At step 401 the system receives image data from the field (e.g. a driver using the system has identified a possible violation). At step 402 the data is provided to an AI module for review. The AI module is generated as a result of machine learning on a plurality of data reviewed by the system (the AI may reside on the device itself or at a server). At decision block 403 it is determined if the AI detected a violation. If not, the system returns to step 401. In one embodiment, if the AI detects a violation, the video is broadcast to enforcement vehicles. The video includes appropriate metadata, including geospatial information, so that enforcement vehicles nearby will receive the video. If the AI is unable to verify a video, it is forwarded to a central enforcement office, e.g. 911 emergency services, for dispatcher review (404) and possible broadcast (406).

Another disadvantage with current traffic enforcement systems is the amount of time required to prepare and issue a citation to the driver. Each moment that an enforcement officer is busy writing a traffic ticket is time that the enforcement officer is unable to catch other violators. The present system provides a method and apparatus to greatly reduce the amount of time needed to issue citations.

Figure 5:
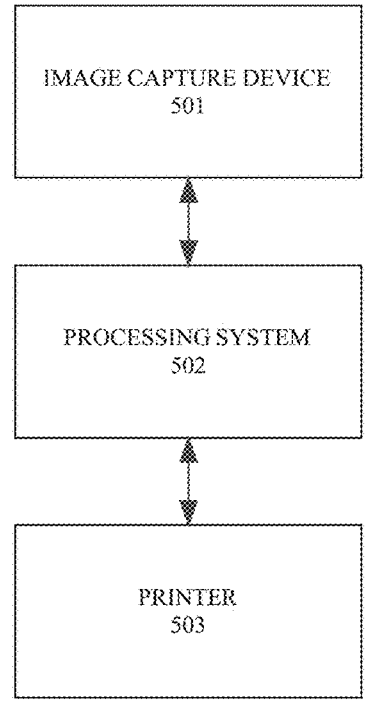
FIG. 5 is a flow diagram illustrating ticket printing in an embodiment of the system.

FIG. 5 illustrates the citation issuing system in an embodiment of the system. The system comprises Image Capture Device 501, coupled to a processing system 502 and Printer 503. The Image Capture Device 501 may be a dashcam, smartphone, integrated vehicle camera, and the like. The Image Capture Device 501 is in communication with a processing system 502. The processing system may be resident on the Image Capture Device 501, it may be located in the vehicle of the enforcement officer. It may be located remotely and in communication with the Image Capture Device 501 via wireless communication. The processing system 502 uses image data from Device 501 to identify a vehicle of interest. This may be accomplished by scanning the license plate, VIN, or any other identifying information that may be available on a target vehicle.

The processing system is used to autocomplete a citation which can then be printed using the printer 503. In one embodiment, the system can use voice commands of an enforcement officer to initiate the printing of a citation. For example, the officer could state "Bus Lane Violation Citation" and the system could rapidly print out a citation for such a violation. In another embodiment, the officer is presented with a large touch screen display of vehicles in the field of vision of the Device 501. The officer could tap on a vehicle and the system could begin identification of that vehicle using license plate reading and at the same time present the officer with a menu of possible violations. The officer can tap on the detected violation and the citation could be in progress even as the officer triggers the siren and pulls over the offending vehicle.

In one embodiment, the system could be modal and allow the officer to select a particular violation and to initiate the citation simply by tapping on a vehicle of interest.

Figure 6:
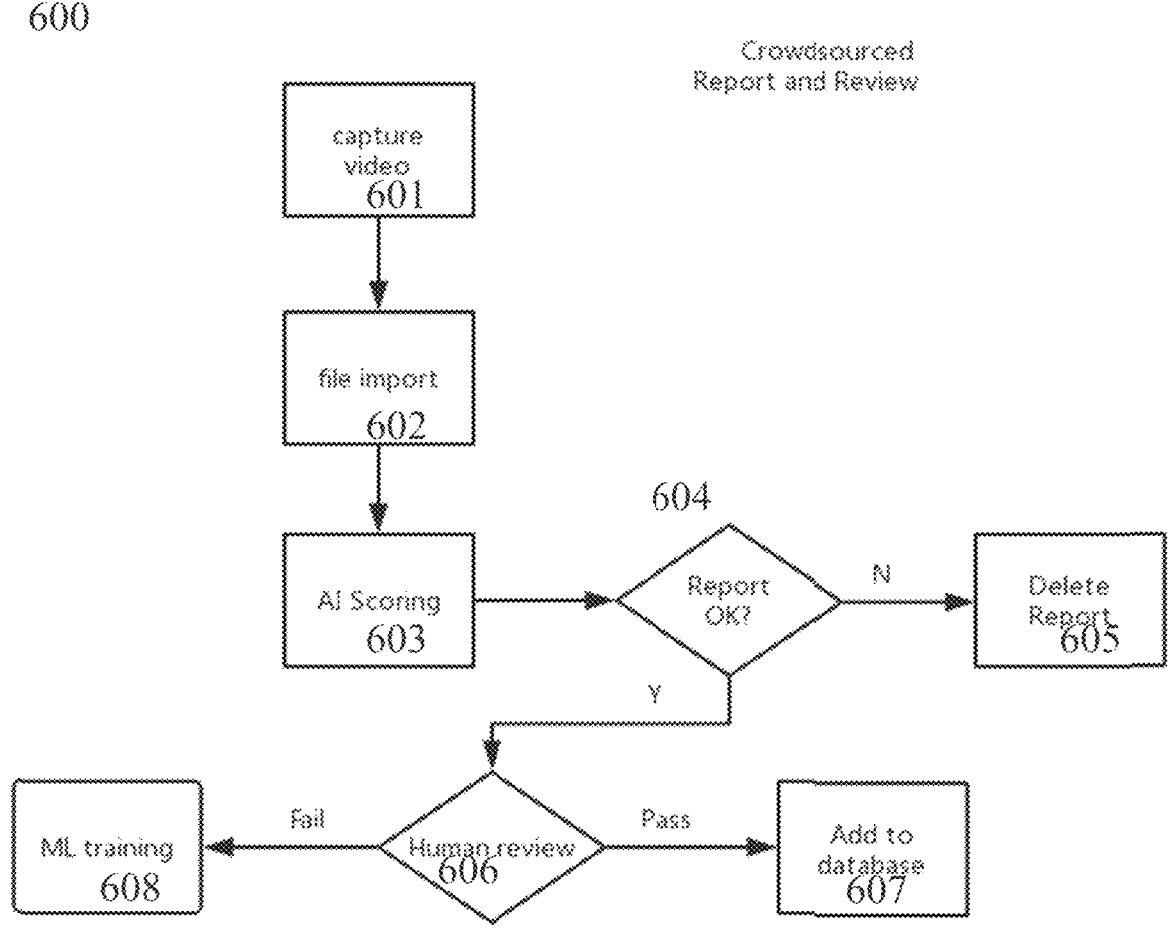
FIG. 6 is a flow diagram illustrating crowd-sourced reporting and reviewing of captured video in an embodiment.

In one embodiment, the AI and machine learning are trained by crowd sourcing. FIG. 6 is a flow diagram 600 illustrating crowd sourced learning in an embodiment. At step 601 the system captures video. The video can come from drivers who use the app in their vehicles. The video can be provided whenever the driver indicates a potential traffic incident by tapping on the display. In one embodiment, the system may randomly select video segments recorded by the apps in the field, regardless of whether there was an identified traffic incident or not. In one embodiment, the system may use video segments from driving based video games, such as Grand Theft Auto™, for example. Segments from video games are particularly helpful because they can be preselected to show a particular traffic incident and can provide multiple instances, viewing angles, and traffic conditions to help train the AI.

At step 602 the video file is imported into the system. In one embodiment, the cloud or server-based system uses TensorFlow for machine learning. At step 603 the video file is scored. The system may have a plurality of possible traffic incidents to review in each video file, and the system will assign a score based on the likelihood that one or more of the traffic incidents is present in the video file. The AI will then present an incident report with the results.

At decision block 604 it is determined if the incident report is OK, meaning that there was at least one traffic incident identified by the AI scoring. If not, the report is deleted. In one embodiment, the no-incident reports from the AI are reviewed to identify potential false negatives and to use for further training of the AI. If there is at least one traffic incident identified in the incident report at step 604, the report is reviewed by one or more humans at decision block 606. If the human review agrees with the AI report, the report is added to the database at step 607. If not, the report is provided to the machine learning step 608 where it is used to further refine the AI.

The machine learning step 608 may use one or more modules to look for various driver incidents. In one embodiment, the System includes a traffic light detector module, a speed detector module, a vehicle detector module, a license plate reader module, a U-turn detector module, a Lane change detector module, a stop sign detector module, and the like. The system combines live video with pre-trained object detectors. For example, the system may be trained on a population of stop signs, traffic lights, lanes, and the like so that those objects are easier to detect when reviewing video. If a stop sign is detected, the system knows to consider the stop sign violation module in its analysis and learning.

In operation, the system may use the YOLO algorithm for object detection. The system draws a YOLO (You Only Look Once) box around objects in the video and can assign values (e.g. self, box_confidence, boxes, box_closs_probs) where box_confidence is a tensor of shape (19,19,5,1), boxes is a tensor of shape (19, 19, 5, 4), box_class_probs is a probability (19, 19, 5, 80). The system can use the shape of identified boxes, and the dimensions, to help determine type of vehicle, speed, lane changes, U-turns, and the like. A tensor is an object having a data type and a shape. YOLO is a pre-trained object detector.

FIGS. 7-12 illustrate the operation of machine learning when reviewing videos uploaded as possible violations by a driver. The machine learning will look for certain elements in the video, based on the violation reported, to determine if there is at least a threshold likelihood that a correct violation has been reported. The system will assign points for the presence of these elements, and pass the video on if the threshold number of points has been assigned. For example, for a stop sign violation, the system will assign points for the presence of the vehicle, license plate recognition, and presence of a stop sign. If at least those elements are not present, it is unlikely that a stop sign violation can be verified in a video clip.

Figure 7:
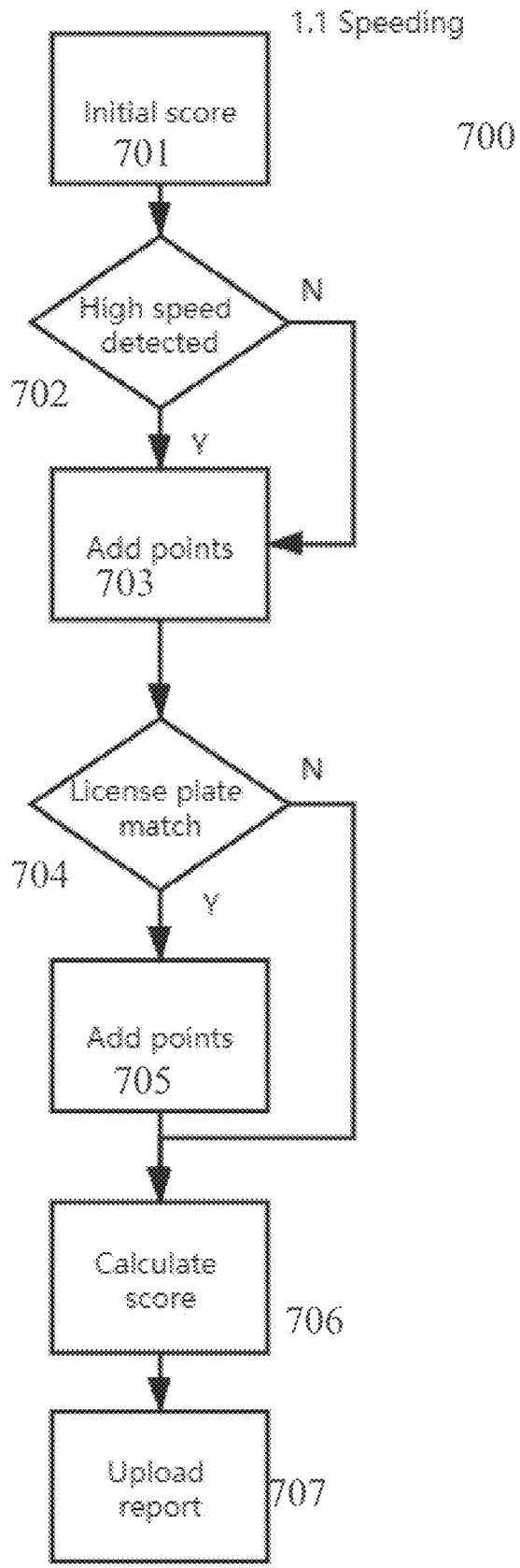
FIG. 7 is a flow diagram illustrating speeding detection in an embodiment.

FIG. 7 is a flow diagram 700 illustrating the detection of speeding in an embodiment. At step 701 the system sets an initial score for a potential speeding vehicle. At decision block 702 it is determined if high speed is detected. In one embodiment the system draws a graphical box around a vehicle and detects the change in size of the box over a period of time. The system also knows the speed of the vehicle during the observation. The system can then generate the Delta between the speed of the vehicle during the observation and the vehicle under consideration. The system then adds that Delta to the observation vehicle speed to determine the speed of the target vehicle. If the vehicle is speeding at decision block 702 the system proceeds to step 703 and adds points to the report for that vehicle. After step 703 or if there is no high speed detected at step 702 the system proceeds through step 704.

At step 704 it is determined if there is a license plate match for the vehicle under observation. If so, the system adds points to the report at step 705. after step 704 or if there is no match at decision block 704 the system calculates the score of that vehicle had step 706. At step 707 the incident report is uploaded. For a vehicle to be flagged as speeding it must have enough points from this process. If a vehicle is speeding but does not appear in the video and or does not have a license plate match then it will not have enough points to report the incident. In one embodiment there is a minimum score of 80% for the video clip to pass screening. The number of points for each stage are not fixed but can change as appropriate.

Figure 8:
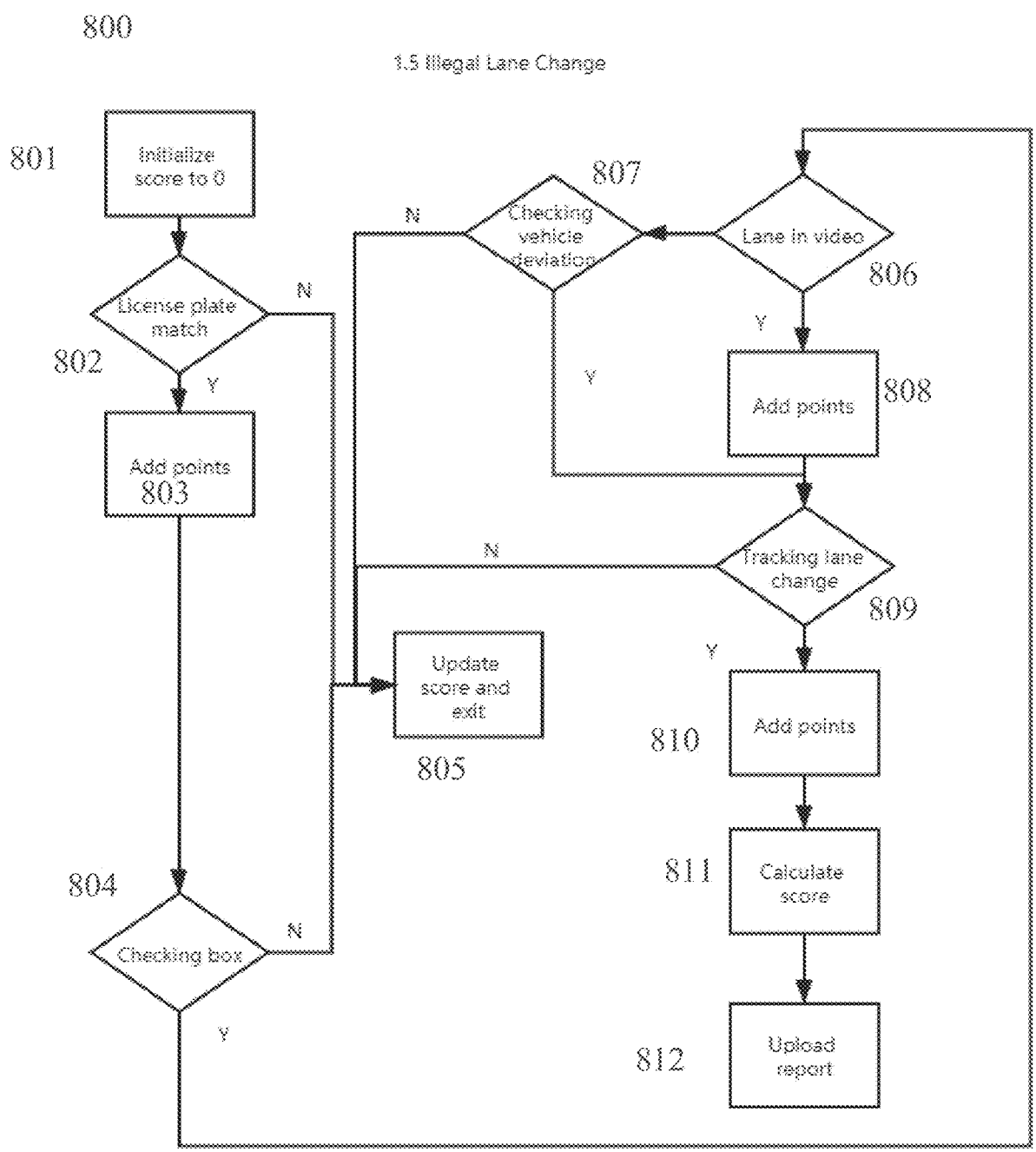
FIG. 8 is a flow diagram illustrating detection of an unsafe lane change in an embodiment.

FIG. 8 is a flow diagram 800 illustrating detection of an unsafe lane change in an embodiment of the system. At step 801 the score for the target vehicle is set to zero. At decision block 802 it is determined if there is a license plate match for the target vehicle. If not, the system moves too step 805 updates the score for that vehicle and exits. If so, the system proceeds to step 803 and adds points to the incident report for that vehicle.

At decision block 804 the system checks the box around the vehicle. The box is used to help define the location and speed of the vehicle. If the system cannot check the box at step 804 the system proceeds to step 805 updates the score and exits. If the system checks the box at step 804 the system proceeds to decision block 806. At step 806 the system determines if the lane is in the video. If the vehicle can be seen in the lane, the system adds points at step 808. If the lane is not in the video at step 806, the system proceeds to decision block 807 to check vehicle deviation from the lane. If none, the system proceeds to step 805.

If so, the system then proceeds to decision block 809 and tracks lane changes of the vehicle. If there are no lane changes at step 809 the system proceeds to step 805. If there are lane changes at step 809 the system adds points at step 810. At step 811 the system calculates the score for the target vehicle. At step 812 the system uploads the incident report for the target vehicle. The system uses the box of the vehicle to determine the proximity of the target vehicle to other vehicles on the road to identify unsafe lane changes.

Figure 9:
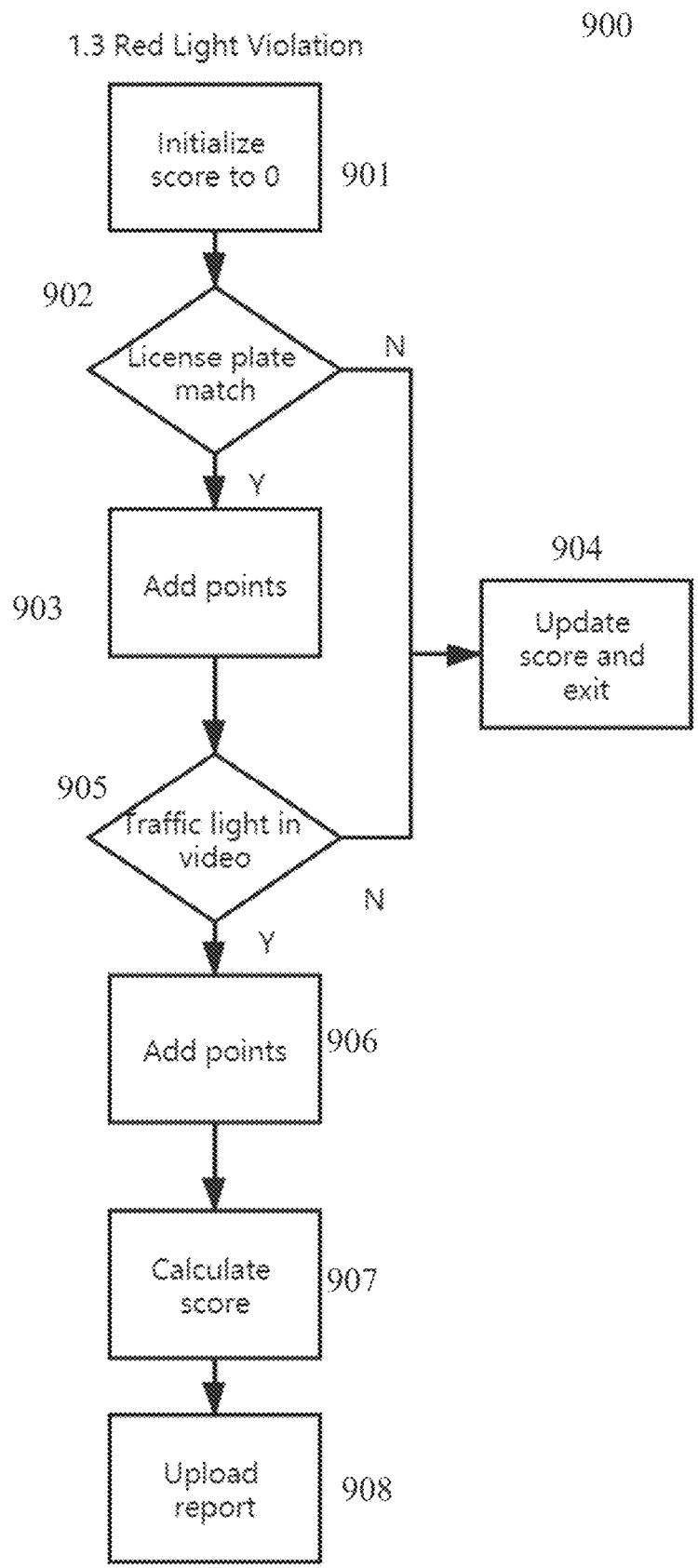
FIG. 9 is a flow diagram illustrating detecting a red-light violation in an embodiment.

FIG. 9 is a flow diagram of the detection of a red light violation in an embodiment of the system. At step 901 a target vehicles score is initialized to zero. At decision block 902 it is determined if there is a license plate match for the vehicle. If no, the system proceeds to step 904, updates the score and exits. If so, the system adds points to the vehicle score at step 903 and proceeds to decision block 905. At decision block 905 it is determined if the traffic light appears in the video. If not, the system proceeds to step 904. If so, the system adds points to the vehicle report at step 906, calculates the score at 907, and uploads the report at step 908. If the report qualifies to be reviewed by a person, a human reviewer can then confirm whether a violation has taken place. When there is disagreement between the human reviewer and the machine learning/AI, the report will be fed back into training the machine learning algorithms to improve the machine learning over time.

Figure 10:
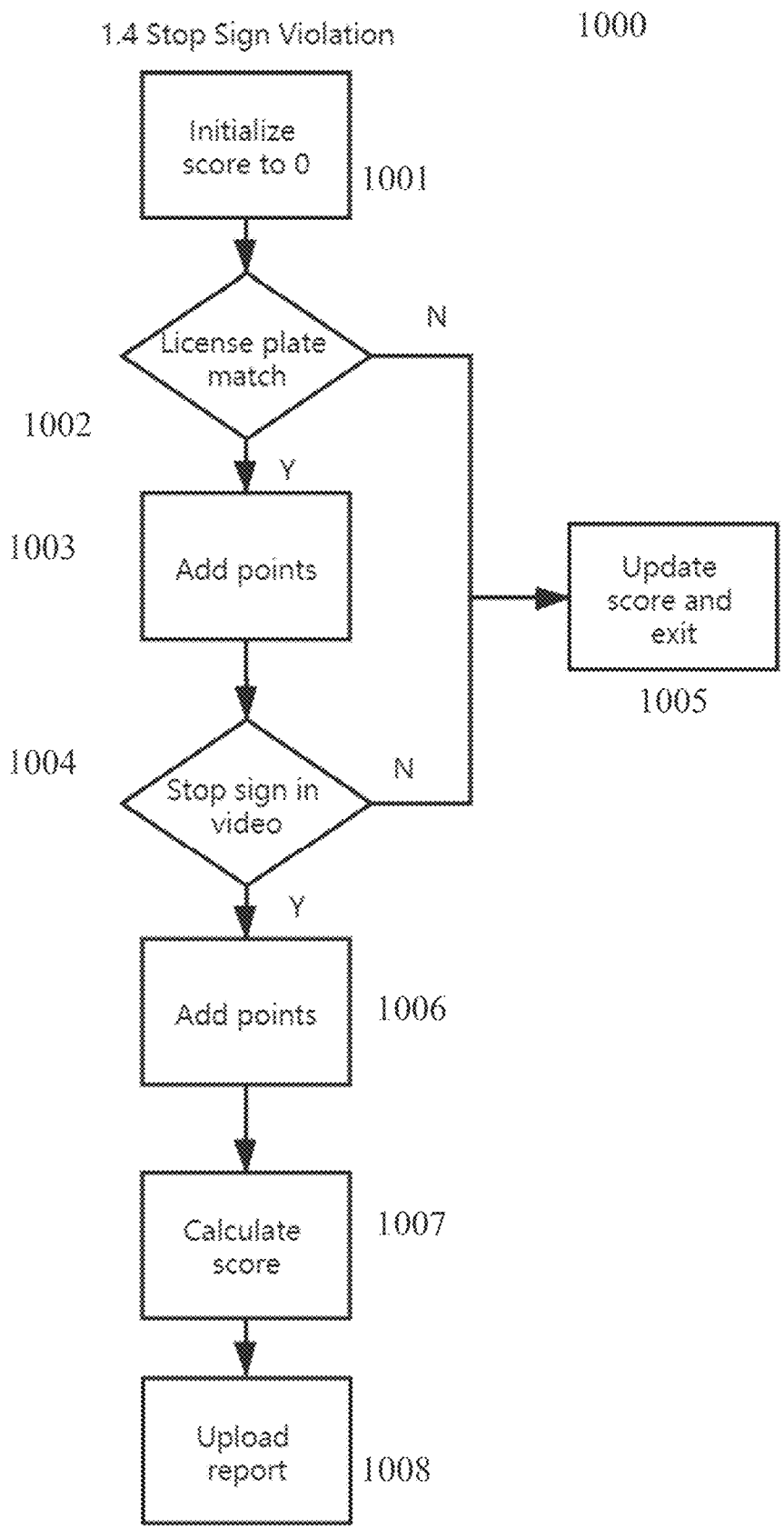
FIG. 10 is a flow diagram illustrating detecting a stop sign violation in an embodiment.

FIG. 10 is a flow diagram 1000 of detecting a stop sign violation in an embodiment of the system. At step 1001 the target vehicle score is initialized to zero. At decision blocks 1002 it is determined if there is a license plate match for the vehicle. If not, the system proceeds to step 1005, updates the score, and exits. If so, the system proceeds to step 1003 and adds points to the vehicle incident report. At decision block 1004 it is determined if there is a stop sign in the video. If not, the system proceeds to step 1005. If so, the system adds points at step 1006. The system calculates the score at 1007 and uploads the report add step 1010 where it can be checked by a human reviewer.

Figure 11:
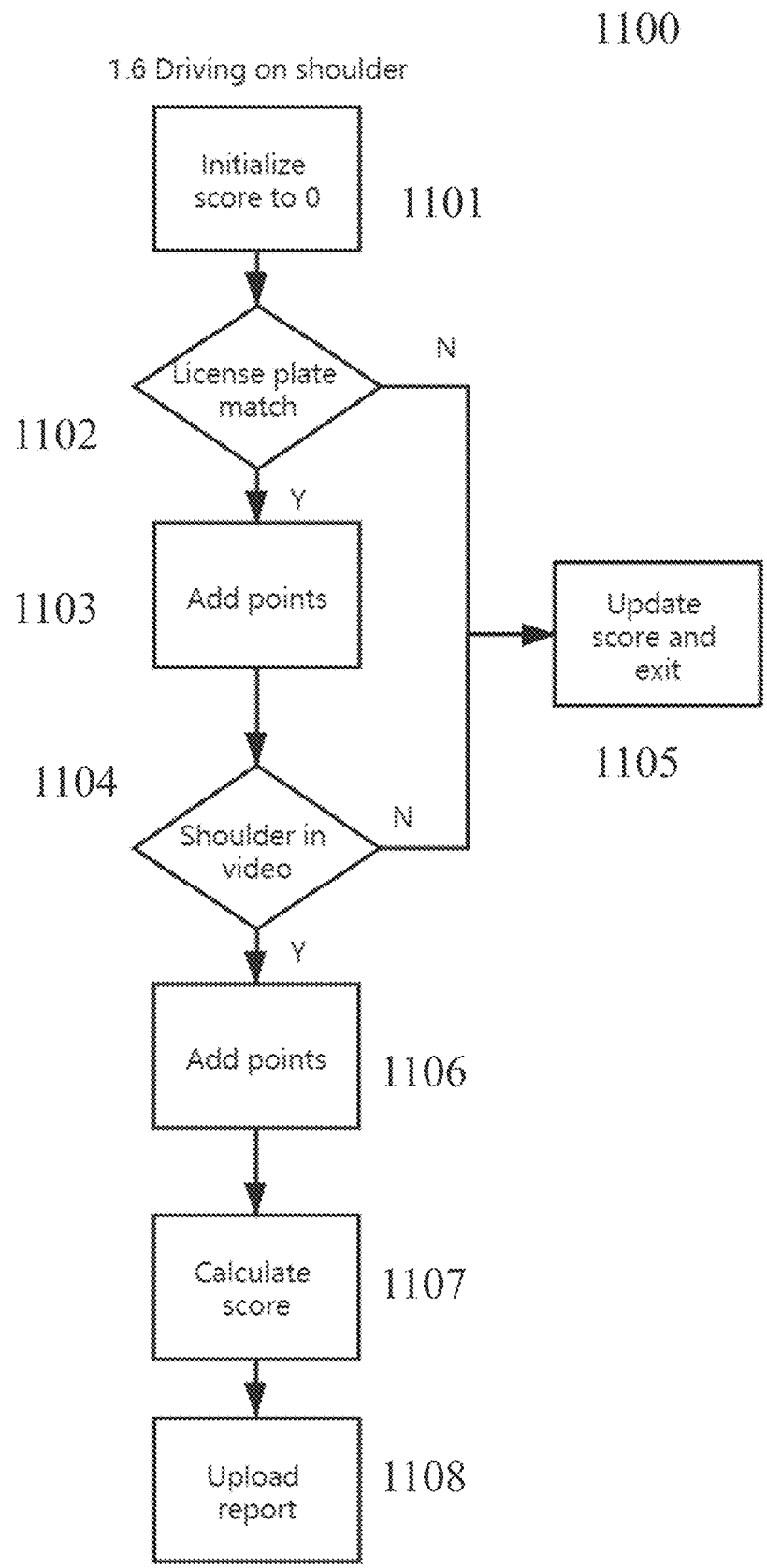
FIG. 11 is a flow diagram illustrating detecting driving on the shoulder in an embodiment.

FIG. 11 Is a flow diagram 1100 illustrating driving on a shoulder in an embodiment of the system. At step 1101 the target vehicle score is set to zero. At decision block 1102 it is determined if the target vehicle license plate is a match. If not, the system proceeds to step 1105 updates the vehicle score and exits. If so, the system proceeds to step 1103 and adds points to the vehicle inspection report. At decision block 1104 it is determined if the shoulder appears in the video. If not, the system proceeds to stop 1105. If so, the system proceeds to step 1106 and adds points to score. At step 1107 the system calculates a score for the vehicle and updates the incident report at step 1108.

Figure 12:
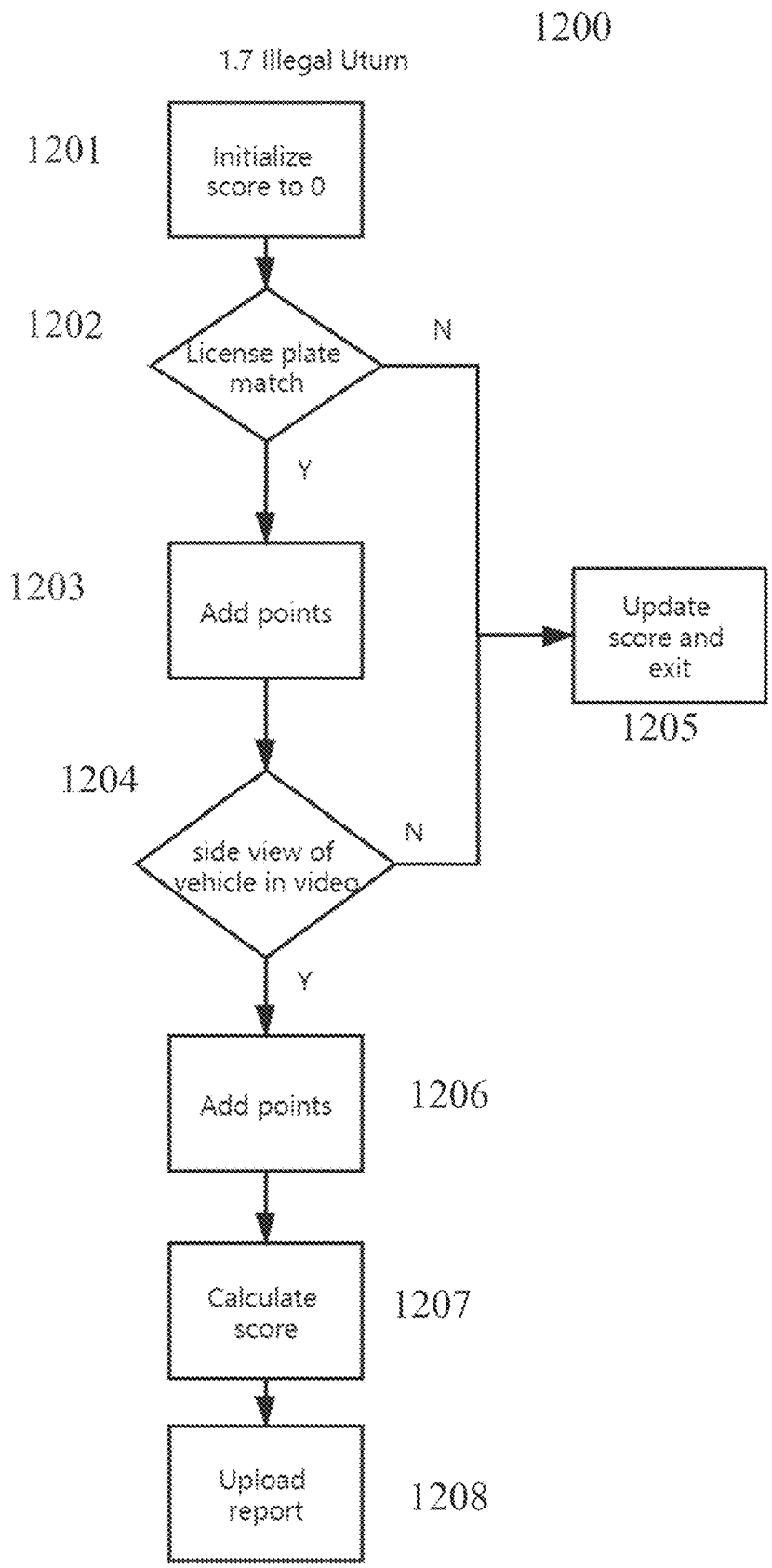
FIG. 12 is a flow diagram illustrating detecting an illegal U-turn in an embodiment.

FIG. 12 is a flow diagram 1200 that illustrates detection of an illegal U-Turn in an embodiment of the system. Except

1201 the system initializes the target vehicle score to zero. At decision block 1202 it is determined if there is a license plate match. If not, the system moves to step 1205 updates the score for that target vehicle and exits. If so, the system moves to step 1203 and adds points to the target vehicle. at decision block 1204 it is determined if a side view of the vehicle appears to determine if the target vehicle has made a U-turn. The system has been trained to recognize the side of vehicles. If the vehicle is not making a U turn at decision block 1204 the system proceeds to step 1205. If the vehicle is making a U turn at step 1204 the system adds points at step 1206. At step 1207 the system calculates the score for the target vehicle and uploads an incident report at step 1208.

Figure 13:
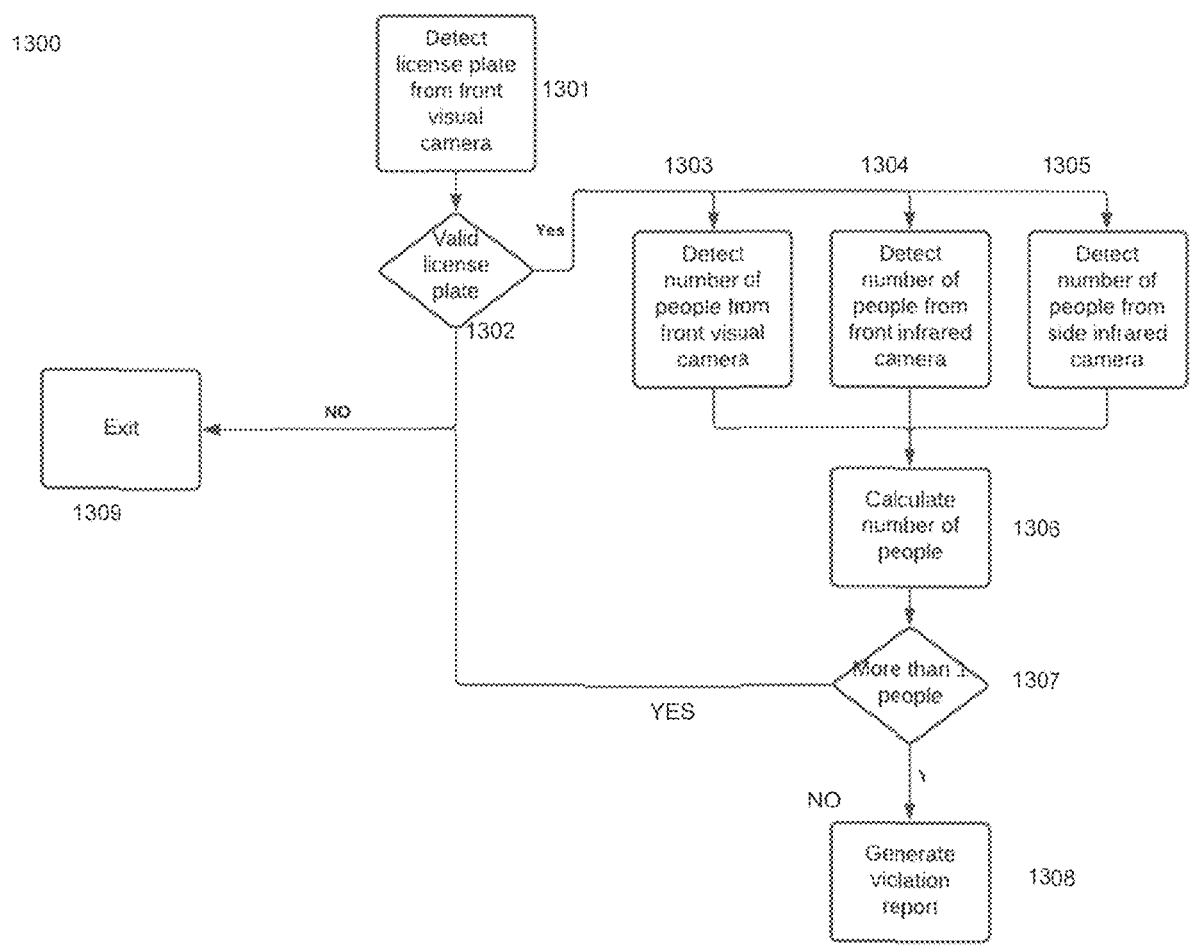
FIG. 13 is a flow diagram illustrating an HOV lane violation in an embodiment.

FIG. 13 is a flow diagram 1300 of a method of detecting a high occupancy vehicle Lane violation in an embodiment of the system. At step 1301 the system detects a license plate of a target vehicle. At decision block 1302 it is determined if the license plate is valid. If not, the system exits at step 1309. If it the license plate is valid the system proceeds to determine the number of the people in the target vehicle using three steps 1303, 1304, and 1305. Step 1302 detects the number of people in the vehicle from a visual camera. Step 1304 detects the number of people from a front infrared camera. Step 1305 detects the number of people from a side infrared camera. After those steps are complete the system calculates the number of people in the target vehicle except 1306. At decision block 1307 it is determined if there are more than one person in the vehicle. If so, there is no Lane violation and the system proceeds to exit at step 1309. If not, the system generates a violation report at step 1308.

Figure 15:
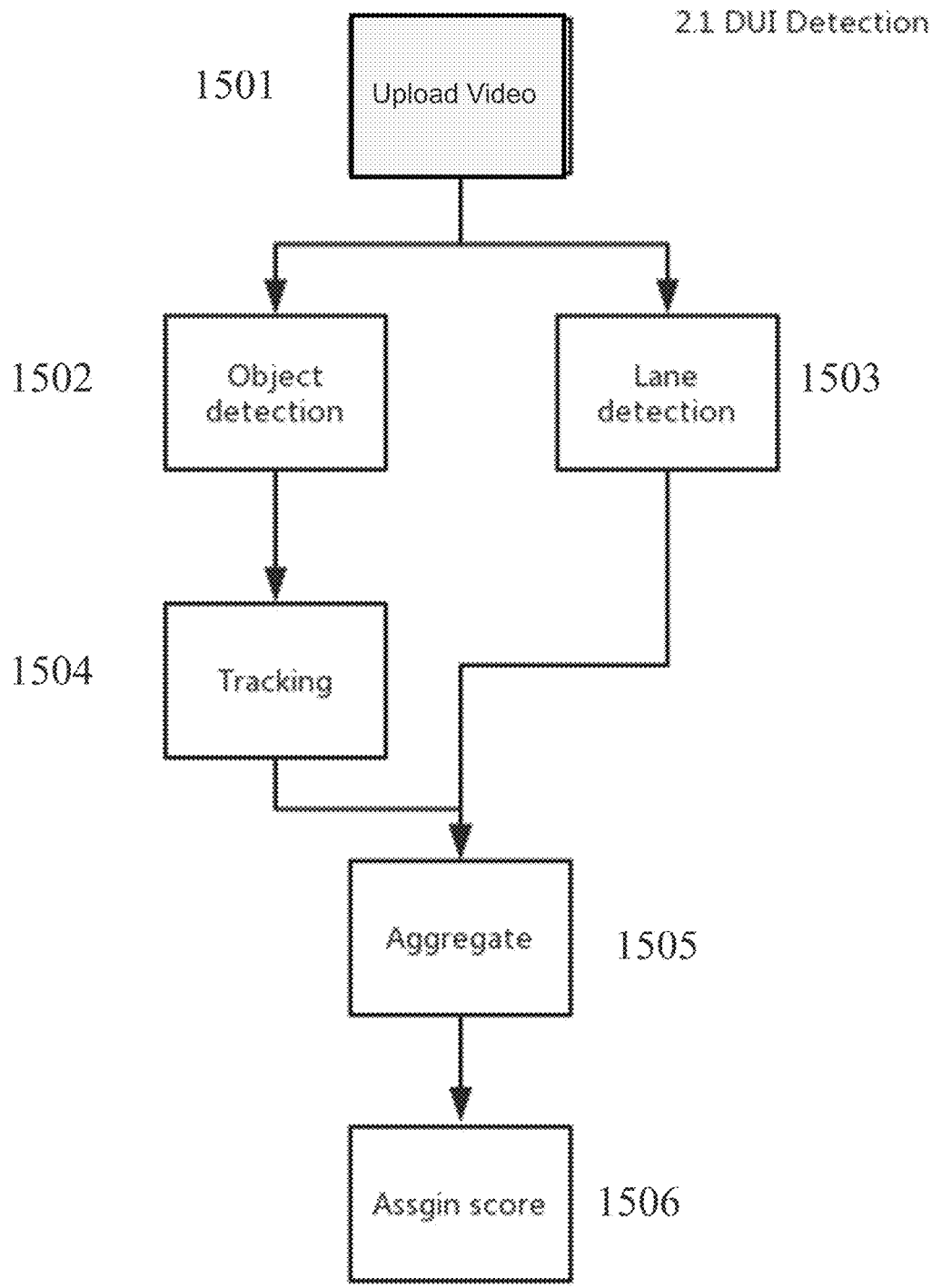
FIG. 15 is a flow diagram illustrating detecting impaired driving in an embodiment.

FIG. 15 is a flow diagram 1500 illustrating DUI detection in an embodiment of the system. The system uses video recording technology and a tracking system to identify vehicles making excessive numbers of lane changes, failure to maintain a lane, unusual vehicle speed behaviors, speeding, illegal lane change, running red lights and stop signs, all indicators of possible DUI behavior. At step 1501 the system uploads video from a potential DUI incident. Accept 1502 the target vehicle is detected. At step 1503 Lane detection is identified. Except 1504 the system tracks the target vehicle. At step 1505 the system aggregates the detected behavior of the vehicle and assigns a score at 1506. If the score is high enough at step 1506, the system identifies a potential DUI incident.

Figure 16:
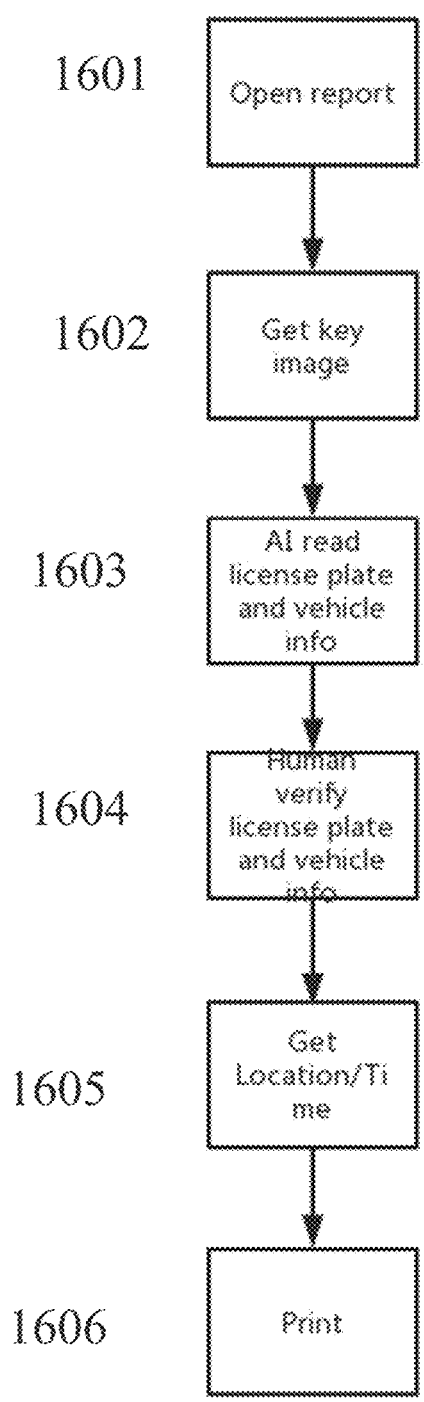
FIG. 16 is a flow diagram illustrating citation generation in an embodiment.

FIG. 16 is a flow diagram 1600 of a method of generating a citation in an embodiment of the system. At step 1601 an enforcement officer may open a report on a processing device. At step 1602 the officer will get a key image of the vehicle. Accept 1603 the AI system reads the license plate and vehicle information and checks it against a database. Accept 1604, in one embodiment, a human may verify the license plate and vehicle info as a double check on the AI. Accept 1605 the system obtains the location and the time of the citation. At step 1606 the system prints the citation for the enforcement officer to provide to the vehicle owner or driver.

Example Computer System

Figure 19:
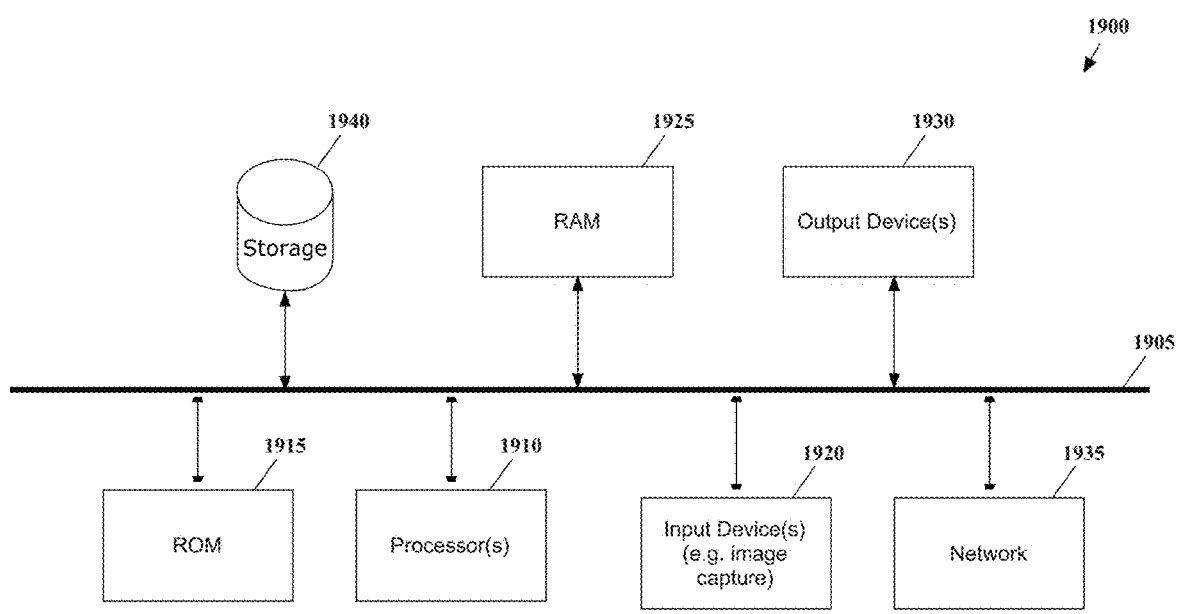
FIG. 19 illustrates an example computer environment in an embodiment.

FIG. 19 illustrates an exemplary a system 1900 that may implement the system. The electronic system 1900 of some embodiments may be a mobile apparatus. The electronic system includes various types of machine-readable media and interfaces. The electronic system includes a bus 1905, processor(s) 1910, read only memory (ROM) 1915, input device(s) 1920, random access memory (RAM) 1925, output device(s) 1930, a network component 1935, and a permanent storage device 1940.

The bus 1905 communicatively connects the internal devices and/or components of the electronic system. For instance, the bus 1905 communicatively connects the processor(s) 1910 with the ROM 1915, the RAM 1925, and the permanent storage 1940. The processor(s) 1910 retrieve instructions from the memory units to execute processes of the invention.

The processor(s) 1910 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine-readable storage medium (also referred to as machine readable medium). When these instructions are executed by one or more of the processor(s) 1910, they cause the processor(s) 1910 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 1910. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 1900, define one or more specific machine implementations that execute and perform the operations of the software programs.

The ROM 1915 stores static instructions needed by the processor(s) 1910 and other components of the electronic system. The ROM may store the instructions necessary for the processor(s) 1910 to execute the processes provided by the system. The permanent storage 1940 is a non-volatile memory that stores instructions and data when the electronic system 1900 is on or off. The permanent storage 1940 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 1925 is a volatile read/write memory. The RAM 1925 stores instructions needed by the processor(s) 1910 at runtime, the RAM 1925 may also store the real-time video or still images acquired by the system. The bus 1905 also connects input and output devices 1920 and 1930. The input devices enable the user to communicate information and select commands to the electronic system. The input devices 1920 may be a keypad, image capture apparatus, or a touch screen display capable of receiving touch interactions. The output device(s) 1930 display images generated by the electronic system. The output devices may include printers or display devices such as monitors.

The bus 1905 also couples the electronic system to a network 1935. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

Thus, a method and apparatus for traffic infraction management has been described.

What is claimed is:

1. A method of reporting traffic incidents comprising:
    recording video using a processing device mounted in a first vehicle and showing the video on a display;
    tapping the display when a traffic incident is detected;
    capturing a segment of the recorded video that includes the traffic incident when the display is tapped;
    forwarding an incident report that includes the captured video segment that includes the traffic incident when the display was tapped and additional information related to a vehicle that is the subject of the traffic incident, to a processing center.

2. The method of claim 1 wherein the processing center applies artificial intelligence (AI) to the video segment to determine if the reported traffic incident by a second vehicle is present.

3. The method of claim 2 wherein a human reviews the video segment if the AI determines the reported traffic incident is present and the video segment is forwarded to an enforcement authority when the human also determines the reported traffic incident is present.

4. The method of claim 3 wherein the video segment is 20 seconds in length.

5. The method of claim 4 wherein the video segment includes an image of the license plate of the second vehicle is displayed in the video segment.

6. The method of claim 5 wherein the video segment includes the location and time of the reported traffic incident.

7. A method of detecting a traffic incident comprising:
    in a processing device;
    receiving a video segment of at least one vehicle and a reported traffic incident;
    tracking the vehicle in the video segment;
    analyzing the behavior of the vehicle to determine if the reported traffic incident has occurred;
    wherein the step of analyzing the behavior of the vehicle comprises assigning point values to the vehicle wherein each point represents the presence of one of a plurality of metrics defined as being required to identify the reported traffic incident;
    reporting the traffic incident to an enforcement agency in an incident report.

8. The method of claim 7 wherein the step of analyzing the behavior of the vehicle further comprises;
    identifying the reported traffic incident when the point values exceed a threshold amount.

9. The method of claim 7 wherein the reported traffic incident comprises driving under the influence.

10. The method of claim 9 wherein the metrics comprise speeding, excessive lane changes, and unsafe lane changes.

* * * * *